US012540095B2

United States Patent
Rosenberger et al.

(10) Patent No.: US 12,540,095 B2
(45) Date of Patent: Feb. 3, 2026

(54) METHOD FOR PRODUCING A PREFORM FOR AN ANTI-RESONANT HOLLOW-CORE FIBER HAVING NESTED CAPILLARIES; PREFORM AND INTERMEDIATE PRODUCT

(71) Applicant: Heraeus Quarzglas GmbH & Co. KG, Hanau (DE)

(72) Inventors: Manuel Rosenberger, Hanau (DE); Jaqueline Plass, Hanau (DE); Kay Schuster, Bitterfeld (DE)

(73) Assignee: HERAEUS QUARZGLAS GMBH & CO. KG, Hanau (DE)

(*) Notice: Subject to any disclaimer, the term of this patent is extended or adjusted under 35 U.S.C. 154(b) by 288 days.

(21) Appl. No.: 18/257,769

(22) PCT Filed: Nov. 11, 2021

(86) PCT No.: PCT/EP2021/081390
§ 371 (c)(1),
(2) Date: Jun. 15, 2023

(87) PCT Pub. No.: WO2022/128271
PCT Pub. Date: Jun. 23, 2022

(65) Prior Publication Data
US 2024/0101464 A1 Mar. 28, 2024

(30) Foreign Application Priority Data
Dec. 17, 2020 (EP) ..................... 20214991

(51) Int. Cl.
*G02B 6/032* (2006.01)
*C03B 37/012* (2006.01)

(52) U.S. Cl.
CPC .... *C03B 37/0122* (2013.01); *C03B 37/01245* (2013.01); *C03B 37/01248* (2013.01); *C03B 2203/16* (2013.01); *C03B 2203/42* (2013.01)

(58) Field of Classification Search
USPC .......................................... 428/398
See application file for complete search history.

(56) References Cited

U.S. PATENT DOCUMENTS

2017/0160467 A1 6/2017 Poletti et al.
2018/0267235 A1 9/2018 Russell et al.
(Continued)

FOREIGN PATENT DOCUMENTS

CN 110333571 A 10/2019
DE 102006019333 A1 10/2007
(Continued)

OTHER PUBLICATIONS

Jasion et al., "Fabrication of tubular anti-resonant hollow core fibers: modelling, draw dynamics and process optimization," Optics Express, vol. 27, No. 15, pp. 20567-20582 (2019).
(Continued)

*Primary Examiner* — Ula C Ruddock
(74) *Attorney, Agent, or Firm* — Panitch Schwarze Belsiario & Nadel LLP

(57) ABSTRACT

The invention relates to the production of an anti-resonant hollow-core fiber consisting of a capillary blank and a sleeve tube. The capillary blank comprises an external capillary and a nested internal capillary, and is stretched to a maximum external diameter ODARE_cap and a maximum wall thickness WTARE_caP. The blank is mounted on the inside of the sleeve tube. In order to retain the advantages of the pre-produced capillary blank with respect to ease of assembly and precision, while keeping the associated drawbacks owing to ovality low and predictable, it is proposed that the geometric internal diameter and external diameter of the external capillary and of the internal capillary, as well as ODARE_cap and WTARE_caP, are aligned in relation to
(Continued)

Figure 4:
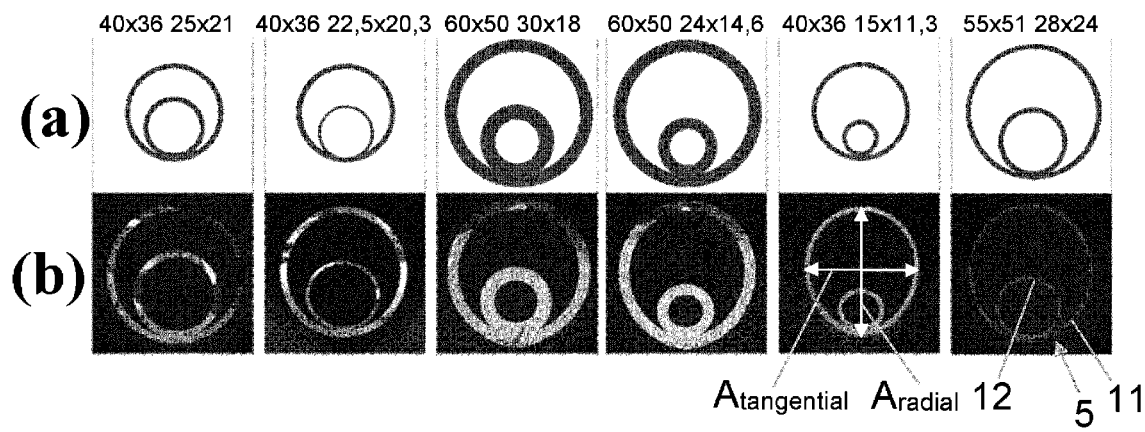

one another in such a way that the ARE-external capillary of the capillary blank has a degree of ovality of less than 1.025.

14 Claims, 3 Drawing Sheets

(56) References Cited

U.S. PATENT DOCUMENTS

| | | |
|---|---|---|
| 2020/0156987 A1 | 5/2020 | Wheeler et al. |
| 2020/0278491 A1 | 9/2020 | Poletti et al. |

FOREIGN PATENT DOCUMENTS

| | | | | |
|---|---|---|---|---|
| GB | 2562688 A | 11/2018 | | |
| JP | 2017520804 A | 7/2017 | | |
| JP | 2020525391 A | 8/2020 | | |
| JP | 2020533264 A | 11/2020 | | |
| WO | 2007122171 A1 | 11/2007 | | |
| WO | WO-2019053412 A1 | * | 3/2019 | ......... C03B 37/0122 |

OTHER PUBLICATIONS

Office Action issued Mar. 12, 2025 in CN Application No. 202180076701.1.
Kosolapov et al: "Hollow-core revolver fibre with a double-capillary reflective cladding," Quantum Electronics, vol. 46, No. 3, pp. 267-270 (2016).
Office Action issued May 28, 2024 in JP Application No. 2023529035.
Poletti, Francesco, "Nested antiresonant nodeless hollow core fiber," Optics Express, vol. 22, No. 20, pp. 23807-23828 (2014).
Schuster et al., "Preparation and applications of germanium and fluorine doped microstructured fibers," Proc. SPIE 6588, Photoonic Crystal Fibers, 658804, (2007) doi:10.1117/12.722470 (Abstract Only).

* cited by examiner

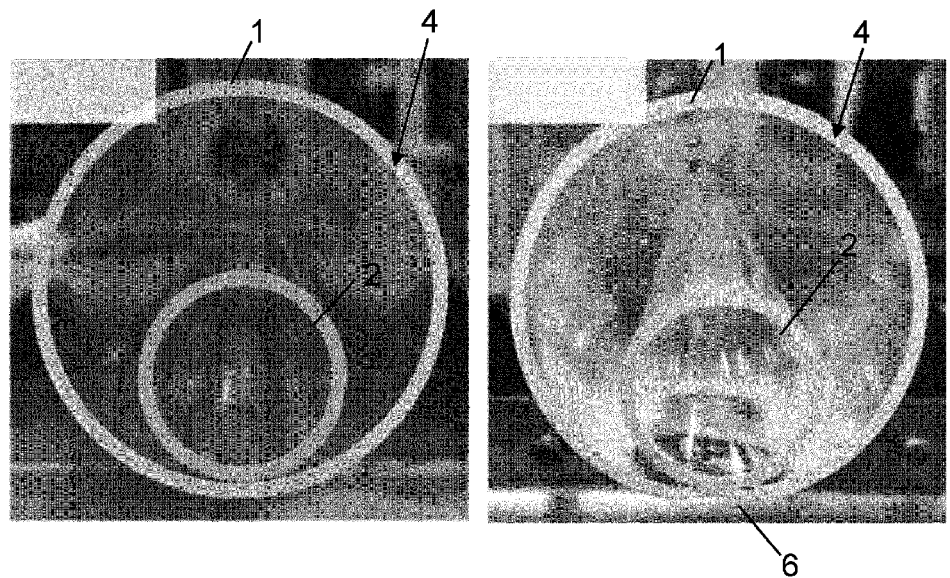
Fig. 1  Fig. 2
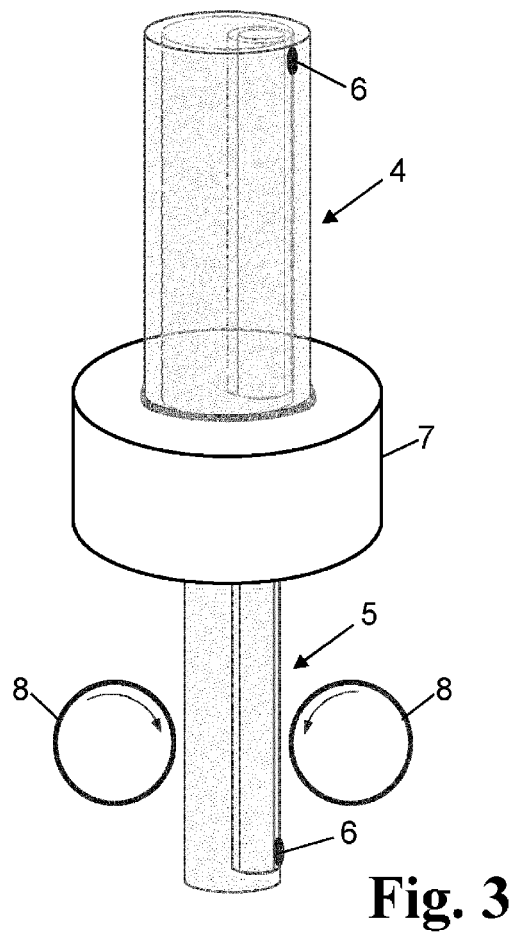
Fig. 3

METHOD FOR PRODUCING A PREFORM FOR AN ANTI-RESONANT HOLLOW-CORE FIBER HAVING NESTED CAPILLARIES; PREFORM AND INTERMEDIATE PRODUCT

TECHNICAL BACKGROUND

The invention lies in the field of optical fiber technology and in particular in the field of anti-resonant hollow-core fibers. Said fibers enable light to be guided in a "hollow" core, which is either evacuated or filled with a gas. This fiber technology promises low optical attenuation, a very broad transmission spectrum (in particular in the UV or IR wavelength ranges as well) and low latency in data transmission. Furthermore, these fibers are suitable for spectroscopy and for the transmission of short laser pulses.

In particular the invention relates to a method for producing an anti-resonant hollow-core fiber comprising a hollow core extending along a longitudinal axis of the fiber and a sheath region surrounding the hollow core, which sheath region comprises a plurality of anti-resonance elements, comprising the method steps of:

(a) providing a sleeve tube comprising an inner bore of the sleeve tube and a longitudinal axis of the sleeve tube along which a sleeve tube wall delimited by an inner side and an outer side extends, (b) providing tubular anti-resonance element preforms, at least a portion of which is present as a capillary blank comprising at least one ARE external capillary and at least one nested NE internal capillary connected to an inner lateral surface of the ARE external capillary, wherein the production of the capillary blank comprises the following method steps:

(b1) fixing an NE inner tube, which has an external diameter $OD_{NE}$ and an internal diameter $ID_{NE}$, on the inner lateral surface of an ARE outer tube having an external diameter $OD_{ARE}$ and an internal diameter $ID_{ARE}$, to form a capillary blank ensemble, (b2) thermal stretching of the capillary blank ensemble to form the capillary blank, which has a maximum external diameter $OD_{ARE\_cap}$ and a maximum wall thickness $WT_{ARE\_cap}$, (c) mounting the capillary blank at target positions on the inner side of the sleeve tube wall to form a primary preform comprising a hollow core region and a sheath region, and (d) elongating the primary preform to form the hollow-core fiber or further processing of the primary preform to form a secondary preform from which the hollow-core fiber is drawn.

The invention also relates to a method for producing a preform for an anti-resonant hollow-core fiber comprising a hollow core extending along a longitudinal axis of the fiber and an inner sheath region surrounding the hollow core, which sheath region comprises a plurality of anti-resonance elements, comprising the method steps of:

(a) providing a sleeve tube comprising an inner bore of the sleeve tube and a longitudinal axis of the sleeve tube along which a sleeve tube wall delimited by an inner side and an outer side extends, (b) providing tubular anti-resonance element preforms, at least a portion of which is present as a capillary blank comprising at least one ARE external capillary and at least one nested NE internal capillary connected to an inner lateral surface of the ARE external capillary, wherein the production of the capillary blank comprises the following method steps:

(b1) fixing an NE inner tube, which has an external diameter $OD_{NE}$ and an internal diameter $ID_{NE}$, on the inner lateral surface of an ARE outer tube having an external diameter $OD_{ARE}$ and an internal diameter $ID_{ARE}$, to form a capillary blank ensemble, (b2) thermal stretching of the capillary blank ensemble to form the capillary blank, which has a maximum external diameter $OD_{ARE\_cap}$ and a maximum wall thickness $WT_{ARE\_cap}$, (c) mounting the capillary blank at target positions on the inner side of the sleeve tube wall to form a primary preform comprising a hollow core region and a sheath region, and (d) optionally further processing the primary preform to form a secondary preform for the hollow-core fiber, wherein the further processing comprises a single or repeated performance of one or more of the following hot-forming processes:

(i) elongation,
(ii) collapse,
(iii) collapse and simultaneous elongation,
(iv) collapse of additional sheath material,
(v) collapse of additional sheath material and subsequent elongation,
(vi) collapse of additional sheath material and simultaneous elongation Furthermore, the invention relates to a capillary blank as an intermediate product for the production of an anti-resonant hollow-core fiber, which comprises at least one ARE external capillary and at least one nested internal capillary connected to the inner lateral surface of the ARE external capillary.

In addition, the invention relates to a preform for an anti-resonant hollow-core fiber, wherein the preform has a hollow core region and a sheath region, which comprises a sleeve tube with a sleeve tube wall and a number of tubular anti-resonant element preforms arranged on an inner side of the sleeve tube wall.

Conventional single-mode optical fibers made of solid material have a core region made of glass, which is surrounded by a sheath region made of glass with a lower refractive index. Light guidance is based thereby on total reflection between the core and the sheath region. However, the interactions of the guided light with the solid material are associated with an increased latency in data transmission and relatively low damage thresholds with respect to high-energy radiation.

These disadvantages are prevented or reduced by "hollow-core fibers" in which the core comprises an evacuated cavity filled with gas or liquid. In hollow-core fibers, the interaction of the light with the glass is less than in solid-core fibers. The refractive index of the core is less than that of the sheath, so that light guidance by total reflection is not possible and the light would normally escape from the core into the sheath. As a function of the physical mechanism of the light guidance, hollow-core fibers are divided into "photonic bandgap fibers" and "anti-resonance reflection fibers."

In the case of "photonic bandgap fibers," the hollow core region is surrounded by a sheath in which small hollow channels are arranged periodically. On the basis of semiconductor technology, the periodic structure of the hollow channels in the sheath brings about the effect referred to as the "photonic bandgap," according to which light of certain wavelength ranges scattered at the sheath structures can constructively interfere due to Bragg reflection in the central cavity and cannot propagate transversely in the sheath.

In the embodiment of the hollow-core fiber referred to as "anti-resonant hollow-core fiber" (ARHCF), the hollow core region is surrounded by an inner sheath region in which so-called "anti-resonant elements" (or "anti-resonance elements," "AREs" for short) are arranged. The walls of the anti-resonance elements evenly distributed around the hollow core can act as Fabry-Perot cavities operated in anti-resonance, which reflect the incident light and guide it through the fiber core.

This fiber technology promises a low optical attenuation, a very broad transmission spectrum (even in the UV or IR wavelength ranges) and a low latency in data transmission.

Hollow-core fibers are used in the fields of data transmission, high-power beam guidance, for example for material processing, modal filtering, non-linear optics, in particular for super-continuum generation, from the ultraviolet to the infrared wavelength range. Furthermore, said fibers are suitable for spectroscopic applications and for transmitting short laser pulses.

PRIOR ART

A disadvantage of anti-resonant hollow-core fibers is that higher-order modes are not necessarily suppressed, so that they are often not exclusively single-mode over long transmission lengths and the quality of the output beam deteriorates.

In a paper by Francesco Poletti "Nested anti-resonant nodeless hollow core fiber", Optics Express, Vol. 22, No. 20 (2014); DOI: 10.1364/OE 22.023807, a fiber design is proposed, in which anti-resonance elements are not designed as a simple singular structural element but instead are composed of a plurality of nested structural elements. The nested anti-resonance elements are designed such that higher-order core modes, but not the fundamental core mode, are phase-matched to the sheath modes and are suppressed. As a result, the propagation of the fundamental core mode is always ensured, and the hollow-core fiber can be effectively single-mode over a limited wavelength range.

The preforms for such "nested anti-resonant nodeless hollow core fibers" (NANF) are composed of a plurality of anti-resonant elements (ARE). They are frequently produced in the so-called "stack and draw" method. For example, for the production of a preform for a hollow-core fiber in the "NANF" design, a plurality of anti-resonance element preforms, each consisting of an anti-resonant element outer tube (abbreviated hereinafter to ARE outer tube) and an anti-resonance element inner tube arranged on one side on the inner lateral surface of the ARE outer tube hereinafter abbreviated to NE inner tube), is attached to the inner side of a sleeve tube.

Each of the anti-resonance preforms has a certain deviation from its setpoint geometry, and each positioning and shaping step inevitably leads to geometry deviations that can add up to an absolute geometry error in the preform. This places high demands on accuracy when positioning and fixing the output elements at their respective target positions, in particular in the case of compact arrangements and short distances of the output elements from one another. In order to achieve low attenuation values and broad transmission ranges, in addition to a uniform wall thickness of the anti-resonance elements, in particular their azimuthal position on the inner wall of the sleeve tube is also critical. The attachment point of the NE inner tube on the ARE outer tube should have the same azimuthal position as the attachment point of the ARE outer tube on the inner wall of the sheath tube. In addition, both the distance between the individual attachment points and the peripheral distance between the ARE outer tubes must be as uniform as possible. This cannot be easily achieved with the "stack and draw" technique.

A simplification in this regard results from a technique in which a pre-produced capillary blank is produced, which comprises an ARE external capillary and at least one NE internal capillary fixed to the inner wall of the ARE external capillary. This technique is described, for example, in the paper by A. F. Kosolapov, G. K. Alagashev, A. N. Kolyadin, A. D. Pryamikov, A. S. Biriukov, I. A. Bufetov, E. M. Dianov in "Hollow-core revolver fibre with a double-capillary reflective cladding" in Kvantovaya Elektronika, 2016, Vol. 46, no. 3, p. 267-270. The pre-production of the capillary blank consists in this case in that an ARE outer tube made of quartz glass and an NE inner tube made of quartz glass welded to its inner wall are elongated together to form the capillary blank. The elongated capillary blank is thus composed of an ARE external capillary and an NE internal capillary that is fixedly connected thereto. Five of the elongated capillary blanks are mounted on the inner wall of a sleeve tube made of quartz glass. A template with a five-fold symmetry is used for this mounting. The capillary blanks are fused with the inner wall and this ensemble is elongated to form a primary preform, from which the hollow-core fiber is subsequently drawn.

TECHNICAL OBJECT

Although the pre-produced capillary blank has advantages in terms of ease of assembly and precision, it has been shown that, when the component ensemble is elongated, oval (elliptical) deformations of the initially round tube cross sections can easily occur. During softening and stretching, the NE inner tube is melted on the inner lateral surface of the ARE outer tube. As a result of this contact, forces, which can lead to deformation of the cross section and to an oval cross-sectional shape, act on the inner lateral surface of the ARE outer tube.

Thus, in the known method, the elongated capillary blank has an elliptical cross section with a long cross-sectional axis of 6.28 mm and a short cross-sectional axis of 6.12 mm. The axis length ratio $A_L/A_K$ of the longest cross-sectional axis $A_L$ and of the shortest cross-sectional axis $A_K$ is thus 1.026. This axis ratio is also referred to herein as "ovality" or "degree of ovality".

The ovality of the capillary blank makes exact mounting on the sleeve tube inner wall more difficult. For example, the template used for mounting is generally designed to be a round cross section. And said template makes it difficult to determine its external diameter for subsequent drawing processes and thus impedes an exact and reproducible prediction of the drawing result in the form of the hollow-core fiber.

However, to maintain the resonance or anti-resonance conditions, even small dimensional variations in the order of magnitude of the operating wavelength of the light to be guided cannot be tolerated.

It is, therefore, an object of the invention to provide a method for producing an anti-resonant hollow-core fiber and a preform for anti-resonant hollow-core fibers, with which the advantages of the pre-produced capillary blank can be maintained with respect to the ease of assembly and the precision, but the associated drawbacks owing to ovality can be kept so low and predictable that a high precision of the anti-resonant elements and an exact positioning in the hollow-core fibers can be reproducibly achieved.

In addition, a capillary blank with low ovality is to be provided, which facilitates exact positioning at predetermined azimuthal positions of the sleeve tube and a reproducible prediction of the drawing result.

In addition, the object of the invention is to specify a preform from which an anti-resonant hollow-core fiber with geometrically precise anti-resonance elements, which are positioned as precisely as possible, can be drawn.

SUMMARY OF THE INVENTION

With regard to the method for producing the anti-resonant hollow-core fiber, this object is achieved according to the invention based on a method of the aforementioned type in that the cross-sectional dimensions $OD_{NE}$, $ID_{NE}$, $OD_{ARE}$, $ID_{ARE}$ as well as $OD_{ARE\_cap}$ and $WT_{ARE\_cap}$ are aligned in such a way that the ARE external capillary (11) of the capillary blank (5) has a degree of ovality of less than 1.025.

The starting point for producing the anti-resonant hollow-core fiber is a preform referred to herein as a "primary preform." Usually, the production of the primary preform comprises the installation and the connecting of anti-resonance element preforms to a sleeve tube. At least a portion of the anti-resonant element preforms is present in the form of a pre-produced capillary blank with nested anti-resonance elements. This is understood here to mean a blank comprising an ARE external capillary, on the inner lateral surface of which at least one NE internal capillary is fixed and which extends parallel to the longitudinal axis of the external capillary. In the case of multiply nested anti-resonant elements, at least one further inner NE internal capillary, which likewise extends parallel to the longitudinal axis of the external capillary, is fixed to the inner lateral surface of an outer NE internal capillary. The ARE external capillary and the NE internal capillary or capillaries are fused together and form anti-resonance element preforms.

The primary preform produced using the pre-produced capillary blank can be drawn directly to form the hollow-core fiber. In principle, the primary preform can be further processed to produce therefrom a preform referred to herein as a "secondary preform". Optionally, the hollow-core fiber is drawn from the secondary preform. The production of the secondary preform comprises method steps with which output elements of the hollow-core fiber are produced and positioned in relation to one another, and at least one hot-forming step.

The primary preform and the secondary preform are either monolithic bodies or are part of a coaxial ensemble of components, having a collecting cylinder or having a plurality of collecting cylinders, that is drawn to directly form the hollow-core fiber. The general term "preform" is understood here to mean that component or that coaxial ensemble of components from which the hollow-core fiber is ultimately drawn.

The addition of sheath material is accomplished, for example, by collapsing a collecting cylinder onto the primary preform. The coaxial arrangement of primary preform and collecting cylinder is elongated or is not elongated when the collecting cylinder collapses. The anti-resonance element preforms here are changed in their shape or arrangement, or they are not changed in their shape or arrangement.

To produce a capillary blank with simply nested NE internal capillaries, outlet tubes having a round cross section are used, which are referred to here as ARE outer tube and as NE inner tube. The NE inner tube is fixed to the inner lateral surface of the ARE outer tube. The connection is preferably made on two opposite end-face ends of the ensemble, and it is made, for example, by means of structural holding means, and preferably by local spot bonding or thermal bonding (spot welding).

This component ensemble is softened in zones and stretched (elongated) to form the pre-produced capillary blank in which the ARE external capillaries and the NE internal capillaries have a fixed, predetermined and verifiable position and orientation relative to one another. Pre-production eliminates positioning and alignment measures that would otherwise be necessary during assembly to produce the primary preform. In this respect, these assembly steps are facilitated and the dimensional stability of the anti-resonant element preforms is improved.

However, it has been shown that, when the component ensemble is elongated, oval (elliptical) deformations of the initially round tube cross sections can easily occur. Whilst this also relates to the NE internal capillary, it relates in particular to the ARE external capillary. It has been shown that the degree of the oval deformation of the ARE external capillary is substantially determined by the cross-sectional geometries of the outlet tubes ($OD_{NE}$, $ID_{NE}$, $OD_{ARE}$, $ID_{ARE}$) and of the ARE external capillary ($OD_{ARE\_cap}$, $WT_{ARE\_cap}$) as well as by the taper ratio during thermal stretching (but also as a function of the cross-sectional geometries of outlet tubes and ARE external capillary). In comparison, drawing parameters, such as temperature, feed and draw-off speed, have comparatively little influence on the ovality. Other drawing parameters, such as pressures and gas flows, however, have a noticeable influence on the ovality of the ARE external capillary. For example, a gas flow can cause local cooling, which affects the geometry of the ARE external capillary. With otherwise predetermined drawing parameters, the ovality of the ARE external capillary is mainly a function of the geometric cross-sectional dimensions of the outlet tubes and of the ARE external capillary.

The invention specifies the teaching of how said geometric parameters are to be set so that a predetermined maximum ovality of the ARE external capillary, of, for example, 1.025, can be reproducibly maintained in a capillary blank produced by thermal stretching.

In a preferred method variant, it is provided that the geometric dimensions are set in connection with the following factors (F1) to (F4):

(F1) the ratio of the equilibrium pressure $p_{eq\_NE}$ of the NE inner tube and of the equilibrium pressure $p_{eq\_ARE}$ of the ARE outer tube, (F2) the distance between the ARE outer tube and the NE inner tube relative to the internal diameter of the ARE outer tube $(ID_{ARE}-OD_{NE})/ID_{ARE}$, (F3) the taper ratio $OD_{ARE}/OD_{ARE\_cap}$ during thermal stretching of the capillary blank ensemble, according to method step (b2), (F4) the ratio $OD_{ARE\_cap}/WT_{ARE\_cap}$ of external diameter and wall thickness of the capillary blank.

The equilibrium pressure $p_{eq}$ is the pressure required during elongation of a glass tube so that the glass tube is neither collapsed nor inflated. The equilibrium pressure $p_{eq;NE}$ for the NE inner tube results from:

$$p_{eq;NE} = (2/OD_{NE} + 2/ID_{NE}) \times \sigma \quad (1),$$

and the equilibrium pressure $p_{eq;ARE}$ for the ARE outer tube from:

$$p_{eq;ARE} = (2/OD_{ARE} + 2/ID_{ARE}) \times \sigma \quad (2),$$

where σ is the surface tension at the drawing temperature which can be applied at 0.4 N/m for quartz glass.

Advantageously, the diameter dimensions for an ARE outer tube made of quartz glass or for an NE inner tube made of quartz glass ARE selected such that the equilibrium pressure $p_{eq,NE}$ is in the range of 60 to 90 Pa, preferably in the range of 65 to 80 Pa, and the equilibrium pressure $p_{eq\_ARE}$ is in the range of 25 to 50 Pa, preferably in the range of 30 to 40 Pa.

The ratio of the equilibrium pressures $p_{eq; NE}/p_{eq; ARE}$ in accordance with factor (F1) is a measure of the effectiveness of the surface tension of the single capillary in the capillary blank. The greater the value, the more dominant the effect of the inner capillary (NE) on the ovality of the external capillary (ARE).

Therefore, the equilibrium pressures $p_{eq; NE}$ and $p_{eq; ARE}$ are advantageously set such that the factor (F1) assumes a value in the range of 1.5 to 2.5, preferably a value in the range of 1.5 to 2.

The greater the free distance between the ARE outer tube and the NE inner tube, for one thing, the more complex and more difficult the final processing of the fiber becomes since the internal diameter $ID_{NE\_cap}$ becomes smaller with a greater free distance from the ARE external capillary. Thus, for example, a high-temperature-resistant connection with a pressure connection is technologically more complex. For another thing, the ratio of the equilibrium pressures becomes greater with greater free distance of the AR outer tube from the NE inner tube.

In light of this, it has proven advantageous for the factor (F2) to be set to a value in the range of 0.2 to 0.5, preferably to a value in the range of 0.3 to 0.4.

To reduce absolute geometric errors, a large taper ratio $OD_{ARE}/OD_{ARE\_cap}$ is desirable during thermal stretching. On the other hand, a large draw-down ratio is associated with correspondingly large forming processes and material movements, which can easily lead to undesired deformations in the delicate anti-resonance element preforms.

It has proven to be a suitable compromise for the taper ratio according to factor (F3) to be set to a value in the range of 5 to 10, preferably to a value in the range of 5 to 8.

The ratio $OD_{ARE\_cap}/WT_{ARE\_cap}$ of the external diameter and wall thickness of the capillary blank is a measure of the dimensional stability of the capillary blank. The thinner the wall compared to the external diameter, the more easily the deformation takes place.

With regard to the lowest possible ovality, it has proven successful for the factor (F4) to be set to a value in the range of 15 to 25, preferably to a value in the range of 15 to 20.

In addition, the measured values provide an indication of the dimensional stability of the capillary draw.

In a particularly preferred method variant, the factors (F1) to (F4) are set such that the capillary blank has a degree of ovality of less than 1.020.

It has been shown that the mathematical product of the factors (F1) to (F4) is a measure of the degree of ovality. The smaller the product, the less the ovality of the ARE external capillary in the capillary blank. This measure is referred to below as "geometric parameter" (P(geom.)).

$$P(geom.) = \frac{peq_{NE}}{Peq_{ARE}} \times \frac{OD(NE)}{ID(ARE)} \times \frac{ID(ARE) - OD(ARE)}{OD(AR[E])_{cap}} \times \frac{OD(AR[E])_{cap}}{WT(AR[E])_{cap}} \quad (3)$$

Each individual one of the factors (F1) to (F4) has an influence on the geometric parameter. The smaller the factor, the less its contribution to the ovality of the ARE external capillary. On the basis of the geometric parameter, a person skilled in the art can reliably estimate how the cross-sectional dimensions of the outlet tubes (NE inner tube and ARE outer tube) will effect the degree of ovality with which planned taper ratio. Empirical tests and failures can thus be prevented or at least the number thereof can be reduced. For example, in the case of a geometric parameter of 94, an ovality of 1.04 is to be expected. If the ovality is to be smaller than 1.025, the geometric parameter must not be more than 77.5. If only an ovality of 1.010 is acceptable, the geometric parameter is to be set to 55 or less.

To achieve minimal ovality, the geometric parameter is thus set to a value in the range of 35 to 75, preferably in the range of 40 to 60.

Especially in the case of such multiply nested capillary blanks, the effort for positioning and alignment in comparison with individual components is significantly reduced.

During its further processing to form a primary preform, a plurality of pre-produced capillary blanks is mounted on the inner lateral surface of a sleeve tube.

The primary preform to be produced with the aid of the method preferably has an external diameter in the range of 26 to 230 mm, particularly preferably in the range of 30 to 200 mm.

Additional or no additional sheath material is applied during elongation of the primary preform to form the hollow-core fibers or to form a secondary preform. During elongation, the primary preform is heated in a heating zone in zones. The greater the diameter, the slower the rate of advance into the heating zone and the longer the duration that each axial section of the preform is exposed to the high temperature of the heating zone. However, if the advance rate is too slow during elongation, the anti-resonance element preforms will deform. Therefore, the diameter of the primary preform is preferably at most 230 mm, preferably at most 200 mm. And the diameter of the primary preform is preferably at least 26 mm, particularly preferably at least 30 mm. This is because it has been found that with smaller diameters the thermal inertia of the preform is too low to compensate for any temperature fluctuations in the heating zone.

When the primary preform or the secondary preform is being drawn in accordance with method step (d) to form a hollow-core fiber, an overpressure is preferably produced and maintained in the ARE external capillary and in the NE internal capillary with respect to the elongated hollow core region. The pressure in the ARE external capillary generally differs from the pressure in the NE internal capillary. A hollow-core fiber with a hollow core region and an inner sheath region is obtained, in which the former ARE external capillary forms an anti-resonant element with preferably circular or slightly oval cross section.

The accuracy of the positioning of the preforms on the inner lateral surface of the sleeve tube is further improved by the inner side of the sleeve tube and/or the outer side of the sleeve tube and/or the inner side of the ARE outer tube and/or the outer side of the ARE outer tube being produced by machining, in particular by drilling, milling, grinding, honing and/or polishing.

In comparison to other known forming techniques, said machining techniques provide more precise and finer structures by using heat and pressure, and they avoid contamination of surfaces by molding tools, such as nozzles, presses or fusion molds.

Furthermore, a procedure has proven successful in which the ARE outer tube consists of quartz glass containing at least one dopant that lowers the viscosity of quartz glass and/or that the at least one NE inner tube consists of quartz glass containing at least one dopant that increases the viscosity of quartz glass.

Dopants used to lower the viscosity of quartz glass are preferably fluorine, chlorine and/or hydroxyl groups. Dopants that increase the viscosity of quartz glass are deemed to be $Al_2O_3$ (up to a concentration of 15 ppm by weight) and nitrogen.

The doping makes it possible to adapt the thermal expansion coefficients of adjacent preform components in order to avoid or reduce stresses. It can also be used to reduce the thermal stability of the ARE outer tube relative to that of the at least one nested NE inner tube.

In this respect, it is advantageous for example if, at a measured temperature of 1250° C., the quartz glass of the ARE outer tube has a viscosity at least 0.1 dPa·s lower, preferably a viscosity at least 0.2 dPa·s lower, than the quartz glass of the nested NE inner tube (if the viscosity is given as a logarithmic value in dPa·s).

In a preferred method, the accuracy of the positioning of the capillary blanks in the sleeve tube is further improved in that the ARE external capillary has a wall thickness in the range of 0.2 and 3 mm, preferably a wall thickness in the range of 0.25 and 1 mm, and wherein a sleeve tube with an external diameter in the range of 90 and 230 mm, and preferably with an external diameter in the range of 120 to 200 mm, is used. Said components each have a length of at least 700 mm, preferably at least 1 m. They are relatively large-volume structural elements which simplifies the handling thereof. In addition, with a vertical arrangement of sleeve tube and capillary blank, gravitational force supports the parallelism and vertical alignment of the longitudinal axes of the capillary when the capillary blanks are each positioned and fixed at the target position at their upper face end.

With regard to the production of the preform for the hollow-core fiber, the technical object specified above is achieved according to the invention based on a method of the aforementioned type in that the geometric dimensions $OD_{NE}$, $ID_{NE}$, $OD_{ARE}$, $ID_{ARE}$ as well as $OD_{ARE\_cap}$ and $WT_{ARE\_cap}$ are configured in such a way that the ARE external capillary of the capillary blank has a degree of ovality of less than 1.025.

For this purpose, a pre-produced capillary blank is provided in which an ARE external capillary is fused with at least one NE internal capillary, and in which the ARE external capillary and the NE internal capillary have a fixed, predetermined and verifiable position and orientation relative to one another.

Pre-production eliminates positioning and alignment measures that would otherwise be necessary during assembly to produce the primary preform. In this respect, these assembly steps are facilitated and the dimensional stability of the anti-resonant element preforms is improved.

The production of pre-produced capillary blanks comprises thermal stretching of a component ensemble consisting of an ARE outer tube and an NE inner tube, which can easily result in oval (elliptical) deformations of the initially round tube cross sections. This relates to the NE internal capillary but in particular to the ARE external capillary. It has been shown that the degree of the oval deformation of the ARE external capillary is substantially determined by the cross-sectional geometries of the outlet tubes ($OD_{NE}$, $ID_{NE}$, $OD_{ARE}$, $ID_{ARE}$) and of the ARE external capillary ($OD_{ARE\_cap}$, $WT_{ARE\_cap}$) as well as by the taper ratio during thermal stretching (but also as a function of the cross-sectional geometries of outlet tubes and ARE external capillary). In comparison, drawing parameters, such as temperature, feed and draw-off speed, have comparatively little influence on the ovality. Other drawing parameters, such as pressures and gas flows, however, have a noticeable influence on the ovality of the ARE external capillary. For example, a gas flow can cause local cooling, which affects the geometry of the ARE external capillary. With otherwise predetermined drawing parameters, the ovality of the ARE external capillary is, however, mainly a function of the geometric cross-sectional dimensions of the outlet tubes and of the elongated ARE external capillary.

The invention specifies the teaching of how said geometric parameters are to be set so that a predetermined maximum ovality of the ARE external capillary, of, for example, 1.025, can be reproducibly maintained in a capillary blank produced by thermal stretching.

Measures for producing the preform are explained above in connection with the production of the hollow-core fiber, and these explanations are included herewith.

With regard to the pre-produced capillary blank as an intermediate product for the production of an anti-resonant hollow-core fiber, the technical object specified above is achieved according to the invention based on a capillary blank of the type mentioned at the outset in that the ARE external capillary has a degree of ovality of less than 1.025.

In the pre-produced capillary blank, at least two capillaries are integrally connected to one another and form a tubular component. Pre-production eliminates positioning and alignment measures that would otherwise be necessary during assembly to produce the primary preform. In this respect, these assembly steps are facilitated and the dimensional stability of the anti-resonant element preforms is improved.

The cross-section of the ARE external capillary of the capillary blank is circular or at most has at most a low degree of opacity of less than 1.025, preferably less than 1.020. As a result, the exact positioning of the capillary blank on the inner wall of the sleeve tube and the fixing of its external diameter for subsequent drawing processes as well as an exact and reproducible prediction of the drawing result and more precise production of the hollow-core fiber are facilitated.

The capillary blank and measures for producing the preform are explained above in connection with the production of the hollow-core fiber, and these explanations are hereby incorporated.

With regard to the preform, the aforementioned technical object is achieved according to the invention, based on a preform of the aforementioned type, in that at least a portion of the anti-resonant element preforms is designed as a capillary blank according to the invention.

The preform is a primary preform within the meaning of the invention. The sheath region of the preform comprises the sleeve tube which can be encased by at least one further sheath tube. Anti-resonance element preforms are arranged on the inner side of the sleeve tube and are connected thereto, for example by gluing or thermal bonding. At least a portion of said anti-resonance element preforms, preferably all anti-resonance element preforms, are in the form of a pre-produced capillary blank in which at least two capillaries are integrally connected to one another. Pre-production eliminates positioning and alignment measures that would otherwise be necessary during assembly to produce the primary preform. In this respect, these assembly steps are facilitated and the dimensional stability of the anti-resonant element preforms is improved.

The cross-section of the ARE external capillary of the capillary blank is circular or at most has a low degree of opacity of less than 1.025, preferably less than 1.020. As a result, the exact positioning of the capillary blank on the inner wall of the sleeve tube and the fixing of its external diameter for subsequent drawing processes as well as an exact and reproducible prediction of the drawing result and more precise production of the hollow-core fiber are facilitated.

The capillary blank and measures for producing the preform are explained above in connection with the production of the hollow-core fiber, and these explanations are hereby incorporated.

Definitions

Individual method steps and terms of the above description are additionally defined below. The definitions form part of the description of the invention. That which is expressed in the description is definitive in the event of a factual contradiction between one of the following definitions and the remaining description.

Anti-Resonance Elements

Anti-resonance elements may be simple or nested structural elements of the hollow-core fiber. They have at least two walls that, when viewed from the direction of the hollow core, have a negative curvature (convex) or do not have a curvature (planar, straight). They generally consist of a material that is transparent to the working light, for example glass, in particular doped or undoped $SiO_2$, a plastic, in particular a polymer, a composite material or crystalline material.

Anti-Resonance Element Preform

What are referred to as anti-resonance element preforms are components or constituents of the preform that essentially become anti-resonance elements in the hollow-core fiber by simple elongation during the fiber-drawing process. Nested anti-resonance element preforms form nested anti-resonance elements in the hollow-core fiber. They are composed of an ARE outer tube and at least one further structural element that is arranged in the inner bore of the ARE outer tube. The further structural element can be a further tube which bears against the inner surface of the outer tube. The further tube is referred to as a "nested element" or "NE inner tube" for short or also referred to as "nested NE inner tube".

In the case of multi-nested anti-resonance element preforms, at least one further structural element, for example a third tube abutting against the inner surface of the nested NE inner tube, can be arranged in the inner bore of the NE inner tube. Where there are multiple nested anti-resonance element preforms, in order to distinguish between the plurality of tubes that is arranged within the ARE outer tube, a distinction is optionally made between "outer NE inner tube" and "inner NE inner tube".

The term "cross-section" in conjunction with cylindrical anti-resonance element preforms and their cylindrical structural elements and the capillary blank always refers to the cross-section perpendicular to the relevant longitudinal axis of the cylinder, namely, unless otherwise indicated, the cross-section of the outer contour in tubular components (not the cross-section of the inner contour).

Further processing of the primary preform, in particular by hot-forming steps, can result in intermediate products, in which the original anti-resonance element preforms are present in a shape that has been modified compared to the original shape. The changed shape is also referred to here as an anti-resonance element preform.

Preform/Primary Preform/Secondary Preform/Core Preform (Cane)

The preform is the component from which the anti-resonant hollow-core fiber is drawn. It is a primary preform or a secondary preform produced by further processing of the primary preform. The primary preform can be present as an ensemble consisting of at least one sleeve tube and preforms or precursors for anti-resonance elements that are loosely accommodated or firmly fastened therein. The further processing of the primary preform into a secondary preform from which the hollow-core fiber is drawn can comprise a single or repeated performance of one or more of the following hot-forming processes:
  (i) elongation,
  (ii) collapse,
  (iii) collapse and simultaneous elongation,
  (iv) collapse of additional sheath material,
  (v) collapse of additional sheath material and subsequent elongation,
  (vi) collapse of additional sheath material and simultaneous elongation.

As a cane, the literature refers to a preform which is obtained by collapse and/or elongation of a primary preform and which thus falls under the definition of the secondary preform. Typically, it is overlaid with additional sheath material before or during drawing of the hollow-core fiber.

Elongation/Collapse

During elongation, the primary preform is thermally stretched. The stretching can take place without simultaneous collapse. Elongation can take place true to scale, so that, for example, the shape and arrangement of components or constituents of the primary preform are reflected in the stretched, elongated end product. During elongation, however, the primary preform can also be drawn not true to scale and its geometry can be modified.

During collapse, an inner bore is narrowed or annular gaps between tubular components are closed or narrowed. Collapse is generally accompanied by elongation.

Hollow Core/Inner Sheath Region/Outer Sheath Region

The ensemble comprising at least one sleeve tube and ARE preforms loosely accommodated or firmly fastened therein is also referred to herein as "primary preform". The primary preform comprises the hollow core and a sheath region. This sheath region is also referred to as an "inner sheath region" if there is also an "outer sheath region" that has been produced, for example, by collapsing onto the ensemble, and if a distinction is to be made between said sheath regions. The terms "inner sheath region" and "outer sheath region" are also used for the corresponding regions in the hollow-core fiber or in intermediate products obtained by further processing of the primary preform.

The designation "inner side of the tube" is also used as a synonym for "inner surface of the tube" and the designation "outer side of the tube" is also used as a synonym for "outer surface of the tube." The term "inner bore" in conjunction with a tube does not mean that the inner bore has been produced by a drilling process.

Equilibrium Pressure

The equilibrium pressure $p_{eq}$ is the pressure required during elongation of a glass tube so that the glass tube is neither collapsed nor inflated.

The calculation is carried out according to K. Schuster; J. Kobelke; A. Schwuchow; M. Leich; M. Becker; M. Rothhardt; U. Ropke; J. Kirchhof; H. Bartelt; T. Geernaert in "Preparation and applications of germanium and fluorine doped microstructured fibers"; Proc. SPIE 6588, Photoonic Crystal Fibers, 658804 (22 May 2007); doi: 10.1117/

12.722470; based on the internal radius ($r_{internal}$) and external radius ($r_{external}$) of the glass tube according to the following formula:

$$p_{eq} = (1/r_{external} + 1/r_{internal}) \times \sigma \quad (4),$$

where σ is the surface tension at the drawing temperature. σ=0.4 N/m can be applied for quartz glass at the drawing temperature.

Degree of Ovality

The degree of ovality is 1 in a tube with a circular cross section. In the case of a tube with an elliptical cross section, the degree of ovality results from the ratio of the longest cross-sectional axis $A_L$ and the shortest cross-sectional axis $A_K$. The degree of ovality of the capillary blank results from the degree of ovality of its ARE external capillary.

EXEMPLARY EMBODIMENT

Figure 5:
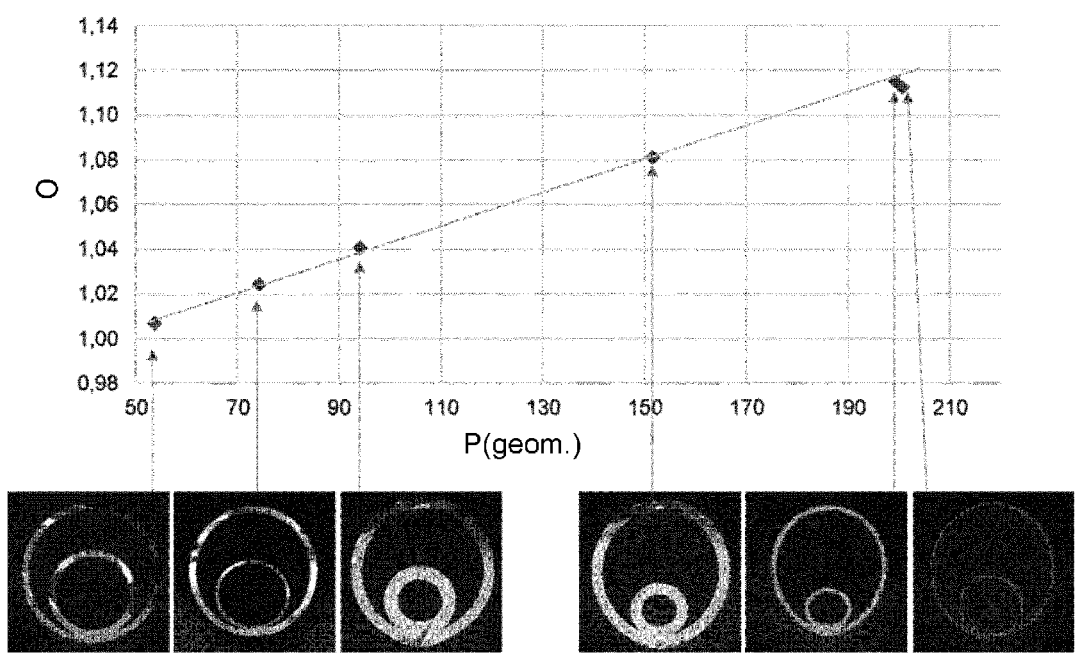
Figure 6:
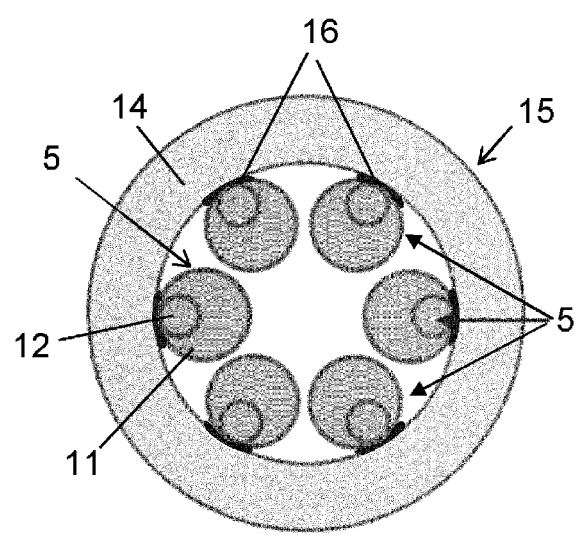

The invention is explained in more detail below with reference to an exemplary embodiment and a drawing. In detail:

FIG. 1 shows a photograph of a loose ensemble of an ARE outer tube and an NE inner tube for producing a capillary blank in a view of the cross section, FIG. 2 shows a photograph of the ensemble of the ARE outer tube and the NE inner tube of FIG. 1 after fixing the tube ends to one another using a thermal joining process, FIG. 3 shows a sketch for explaining a method step for producing a capillary blank using the ensemble of FIG. 2, FIG. 4a shows cross-sections of a plurality of ensembles for producing capillary blanks in idealized form, FIG. 4b shows photographs of cross sections of the capillary blanks produced using the ensemble of FIG. 4a, FIG. 5 shows a diagram for explaining the relationship between degree of ovality and geometric parameter, and FIG. 6 shows a schematic cross-sectional view of a primary preform produced using a plurality of capillary blanks.

FIG. 1 shows a precursor for the production of a pre-produced capillary blank. The precursor is in the form of a loose ensemble 4 of a plurality of nested outlet tubes, namely an ARE outer tube 1 and an NE inner tube 2. All tubes (1; 2) consist of quartz glass and have a circular cross section. Their longitudinal axes extend in parallel and, in the given view, perpendicularly to the paper plane. The NE inner tube 2 abuts with its outer lateral surface against the inner lateral surface of the ARE outer tube 1. The outlet tubes (1; 2) differ in terms of their diameters, but the wall thicknesses and lengths are substantially the same. FIG. 4a and Table 1 contain detailed information on the radial dimensions of the outlet tubes (1; 2) and of outlet tubes of further ensembles.

The outlet tubes (1; 2) are fused to one another in a punctiform manner in the region of the two end faces. The local connection points are marked in FIG. 2 by the reference sign 6.

FIG. 3 schematically shows a method step for further processing the ensemble 4 to form the capillary blank 5. The outlet tube ensemble 4 fixed with the aid of the connection points 6 is fed with vertically oriented longitudinal axes from top to bottom to an annular heating zone 7, softened therein in zones, and a strand (5) is removed from the softened region by means of draw-off rollers 8, from which strand capillary blanks 5 are cut off. During the stretching process, the internal bore of the capillary blank is flushed through with a constant helium gas flow of 25 ml/min. The inner bores of the outlet tubes (1; 2) remain open during this process, so that approximately the same internal pressure is established therein.

After the softening and stretching process, capillary blanks 5 are obtained in which the former outlet tubes (1; 2) are elongated and fused together along their contact surfaces. They changed their cross-sectional shape towards an oval shape as a result of the surface tension effective in the softened region.

This shows the comparison of the idealized representation of the ensembles 4 of samples 1 to 6 from FIG. 4a with the photos of the capillary blanks produced therefrom from FIG. 4b. In the capillary blanks 5, the former ARE outer tube (1) forms an ARE external capillary 11, and the former NE inner tube (2) forms a nested NE internal capillary 12. All capillaries (11; 12) show a more or less oval cross-sectional area. For one of the capillary blanks, dimensioning arrows are drawn in by way of example, wherein the dimension arrow $A_{radial}$ denotes the external diameter of the ARE external capillary 11, measured at the contact point with the nested NE internal capillary 12. Here, this is simultaneously the maximum external diameter of the ARE external capillary 11. The dimension arrow $A_{tangential}$ denotes the cross-sectional dimension of the ARE external capillary 11 measured perpendicular to $A_{radial}$. This dimension simultaneously corresponds to the minimum external diameter of the ARE external capillary 11. With the other capillary blanks, $A_{radial}$ and $A_{tangential}$ are determined analogously.

Table 1 shows the geometric cross-sectional dimensions of the outlet tubes (1; 2) for samples 1 to 6 and the capillary blanks elongated therefrom as well as the factors 1 to 4 of the above equation (3) for the geometric parameter calculated on the basis of these data.

TABLE 1

| Cross-sectional dimensions - factors | Sample 1 | Sample 2 | Sample 3 | Sample 4 | Sample 5 | Sample 6 |
|---|---|---|---|---|---|---|
| OD_ARE [mm] | 40.0 | 40.0 | 60.0 | 60.0 | 40.0 | 55.0 |
| ID_ARE [mm] | 36.0 | 36.0 | 50.0 | 50.0 | 36.0 | 51.0 |
| OD_NE [mm] | 25.0 | 22.5 | 30.0 | 24.0 | 15.0 | 28.0 |
| ID_NE [mm] | 21.0 | 20.3 | 18.0 | 14.6 | 11.3 | 24.0 |
| Feed [mm/min] | 15 | 15 | 9.1 | 10.8 | 15 | 10, 11 |
| Oven temperature [° C.] | 1985 | 1900 | 2000 | 1970 | 1900 | 1970/2020 |
| Oven tube length [mm] | 220 | 220 | 220 | 220 | 220 | 220 |
| Draw-off [mm/min] | 466.2 | 515.5 | 667.1 | 779.6 | 597.7 | 645.5-666.1 |
| OD_ARE$_{cap}$ [mm] | 7.46 | 6.91 | 7.9 | 7.95 | 6.94 | 7.7-7.35 |
| WT_ARE$_{cap}$ [mm] *[1] | 0.37 | 0.35 | 0.66 | 0.66 | 0.35 | 0.28-0.27 |
| $p_{eq\_ARE}$ [Pa] | 42.22 | 42.22 | 29.33 | 29.33 | 42.22 | 30.23 |
| $p_{eq\_NE}$ [Pa] | 70.10 | 74.96 | 71.11 | 88.13 | 124.13 | 61.90 |
| Factor 1: | 1.66 | 1.78 | 2.42 | 3.00 | 2.94 | 2.05 |

TABLE 1-continued

| Cross-sectional dimensions - factors | Sample 1 | Sample 2 | Sample 3 | Sample 4 | Sample 5 | Sample 6 |
|---|---|---|---|---|---|---|
| $P_{eq\_NE}/P_{eq\_ARE}$ Factor 2: | 0.31 | 0.38 | 0.40 | 0.52 | 0.58 | 0.45 |
| $(ID\_ARE - OD\_NE)/ID\_ARE$ Factor 3: | 5.36 | 5.79 | 7.59 | 7.55 | 5.76 | 7.14, −7.48 |
| $OD\_ARE/OD\_ARE_{cap}$ Factor 4: | 20.00 | 20.00 | 12.00 | 12.00 | 20.00 | 27.5-27.2 |
| $OD\_ARE_{cap}/WT\_ARE_{cap}$ Geometric Parameter | 54.4 | 77.1 | 88.4 | 141.5 | 197.7 | 181-190 |
| Ovality − $A_{radial}/A_{tangential}$ | 1.008 | 1.022 | 1.043 | 1.083 | 1.117 | 1.115 |
| $CSA\_ARE\ [mm^2]$ | 238.8 | 238.8 | 863.9 | 863.9 | 238.8 | 333.0 |
| $CSA\_ARE_{cap}\ [mm^2]$ | 8.30 | 7.13 | 14.98 | 15.17 | 7.19 | 5.95 |
| $CSA\_ARE/CSA\_ARE\_cap$ | 28.75 | 33.51 | 57.68 | 56.96 | 33.22 | 56.00 |

Here:
OD_ARE: External diameter of the ARE outer tube
ID_ARE: Internal diameter of the ARE outer tube
OD_NE: External diameter of the NE inner tube
ID_NE: Internal diameter of the NE inner tube
OD_ARE$_{cap}$: External diameter of the ARE external capillary
WT_ARE$_{cap}$: Wall thickness of the ARE external capillary
P$_{eq\_ARE}$: Equilibrium pressure of the ARE inner tube according to Formula (2) where σ = 400 N/mm
P$_{eq\_NE}$: Equilibrium pressure of the NE inner tube according to Formula (1) where σ = 400 N/mm
A$_{radial}$: Short elliptical axis of the ARE external capillary
A$_{tangential}$: Short elliptical axis of the ARE external capillary
CSA_ARE Cross-sectional area of the AR outer tube
CSA_ARE$_{cap}$ Cross-sectional area of the ARE external capillary
*[1] These are not measurement data, but rather diameter target values calculated assuming a ratio pull (true-to-scale diameter reduction due to the elongation).

In samples 1 and 2, the geometric parameter is less than 77.5 and the ovality is below 1.025. These are examples of the invention; the samples 3 to 6 are comparative examples.

In the diagram of FIG. 5, the degree of ovality "O" determined on the capillary blanks of samples 1 to 6 is plotted against the dimensionless geometric parameter "P (geom.)". According to that, the degree of ovality and geometric parameter scale very well, namely largely independently of the drawing temperature and the feed and draw-off speeds. The straight line equation for the regression line is y=0.9682+0.008x where $R^2$=0.9886. By specifying the geometric cross-sectional dimensions, this relationship thus enables a specific adjustment or a prediction of the expected ovality of the capillary blank.

The samples 1 to 7, which follow the linear relationship, have a medium to large wall thickness. More specifically, they cover a large span of 238.8 to 863.9 mm² for the cross-sectional areas (CSA cross-sectional area) of the ARE outer tubes and a likewise wide range of 5.95 to 15.17 mm² for the cross-sectional areas of the ARE external capillary. The cross-sectional area ratios (CSA_ARE/CSA_ARE$_{cap}$) are in the range of 28.75 to 57.68.

It cannot be ruled out that, in the case of very thin-walled samples with a larger surface/volume ratio, other effects gain influence, such as, for example, the heating and cooling behavior of the sample, which could lead to a somewhat different regression line. The ovality of the samples with cross-sectional area ratios (CSA_ARE/CSA_ARE$_{cap}$) above 25, in particular above 28, can also be predicted very well using the straight line equation stated above.

In the case of the samples 1 to 6, the outlet tubes consist of non-doped quartz glass. The linear relationship according to formula (3) also applies to doped quartz glass. Optionally, a different surface tension leads to a different equilibrium pressure according to factor (F1).

FIG. 6 schematically shows a cross section of a primary preform 15 constructed using the capillary blank 5 of sample 1 (Table 1). This represents an intermediate product for producing the hollow-core fiber. The primary preform 15 is composed of a sleeve tube 14 made of quartz glass having a length of 1000 mm, an external diameter of 30 mm and an internal diameter of 24 mm. All capillary blanks 5 are present in each case as a joined ensemble of nested structural elements consisting of an ARE external capillary 11 and a nested NE internal capillary 12. The ARE outer tube 11 has an external diameter of 7.46 mm and the nested NE inner tube 12 has an external diameter in the region of 4.6 mm. The wall thickness of all structural elements (11; 12) is the same and is 0.37 mm. The lengths of the ARE outer tube 11 and nested ARE inner tube 12 correspond to the length of the sleeve tube 14.

The sleeve tube 14 is produced without a molding tool in a vertical drawing process with a two-stage elongation process. In the first stage, a hollow outlet cylinder made of glass is mechanically processed to set the final dimensions of the hollow outlet cylinder. Per the final dimension, the external diameter is 90 mm and the diameter ratio of external and internal diameters is 2.5. In a first elongation process, the outlet cylinder with vertically oriented longitudinal axis is continuously supplied to a heating zone having a heating zone length of 200 mm, softened in regions therein, and an intermediate cylinder is withdrawn from the softened region. In a second elongation process, the intermediate cylinder with a vertically oriented longitudinal axis is continuously supplied to a different heating zone having a heating zone length of 100 mm, softened in regions therein, and a tube section is withdrawn from the softened region. The sleeve tube is obtained from the continuous tube by cutting it to length.

The capillary blanks 5 are fastened to the inner wall of the sleeve tube 14 by means of a bonding compound 16 based on SiO$_2$. The bonding compound 16 is applied locally to the inner lateral surface of the sleeve tube in the region of the ends, and the capillary blanks 5 are placed thereon using a positioning template with a structurally predetermined star-shaped arrangement of holding arms for the individual capillary blanks 5. In this case, the positioning template is limited to the region around the two end-face ends of the sleeve tube.

The primary preform 15 thus produced is thermally stretched in an elongation process to form a so-called "cane" having an external diameter of 20 mm. In this case, the capillary blanks 5 connect to the inner wall of the sleeve tube 14 over the entire length. The stretched sleeve tube 14 is then collected with a collecting cylinder made of quartz glass, wherein the collecting cylinder collapses onto the stretched sleeve tube 14, and at the same time, the ensemble is elongated to form a secondary preform. The collecting cylinder has an external diameter of 75 mm and a wall thickness of 25 mm.

In the collapse and elongation process, the coaxial arrangement of the sleeve tube 1 and the buffer tube coming from below in a vertically oriented longitudinal axis is fed into a temperature-controlled heating zone and softens therein in zones starting with the upper end of the arrangement.

The heating zone is kept at a target temperature of 1600° C. with a control accuracy of +/−0.1° C. Temperature fluctuations in the hot-forming process can thereby be limited to less than +/−0.5° C.

During the collapse and elongation step, the gap between the collecting cylinder and the cane is evacuated.

The secondary preform formed in this way during the collapse and elongation process has an external diameter of 50 mm and a sheath wall thickness of 19.55 mm composed of an outer sheath and an inner sheath (internal diameter: 10.9 mm). The secondary preform is elongated to form an anti-resonant hollow-core fiber. For this purpose, all structural elements of the former capillary blanks 5 are closed using the aforementioned sealing or bonding compound. The sealing compound is applied only to the end face of the capillary blanks that faces upward during the fiber drawing process.

The same end face is then connected to a holding tube made of quartz glass, which simultaneously serves as a gas connection. The retainer is fixed to the collecting cylinder and to the sleeve tube by means of the sealing or bonding compound. In the fiber-drawing process, the secondary preform, in the case of a vertically oriented longitudinal axis, is fed from above into a temperature-controlled heating zone and softens therein in zones starting at the lower end. The heating zone is kept at a target temperature of approximately 2100° C. with a control accuracy of +/−0.1° C. Temperature fluctuations in the hot-forming process can thereby be limited to less than +/−0.5° C. At the same time, gas is supplied to the core region (hollow core) so that an internal pressure of 4 mbar is established in the core region.

By means of the fiber drawing process controlled thus, an anti-resonant hollow-core fiber with anti-resonant elements embedded therein is obtained, which have a round cross-sectional shape.

The invention claimed is:

1. A method for producing an anti-resonant hollow-core fiber comprising a hollow core extending along a longitudinal axis of the fiber and an inner sheath region surrounding the hollow core, which sheath region comprises a plurality of anti-resonance elements, comprising the method steps of:
   (a) providing a sleeve tube comprising an inner bore of the sleeve tube and a longitudinal axis of the sleeve tube, along which a sleeve tube wall delimited by an inner side and an outer side extends,
   (b) providing tubular anti-resonance element preforms, at least a portion of which is present as a capillary blank comprising at least one anti-resonant element (ARE) external capillary and at least one nested element (NE) internal capillary connected to an inner lateral surface of the ARE external capillary, wherein the production of the capillary blank comprises the following method steps:
   (b1) fixing an NE inner tube, which has an external diameter $OD_{NE}$ and an internal diameter $ID_{NE}$, on the inner lateral surface of an ARE outer tube having an external diameter $OD_{ARE}$ and an internal diameter $ID_{ARE}$, to form a capillary blank ensemble,
   (b2) thermal stretching of the capillary blank ensemble to form the capillary blank, which has a maximum external diameter $OD_{ARE\_cap}$ and a maximum wall thickness $WT_{ARE\_cap}$,
   (c) mounting the capillary blank at target positions on the inner side of the sleeve tube wall to form a primary preform comprising a hollow core region and a sheath region, and
   (d) elongating the primary preform to form the hollow-core fiber or further processing of the primary preform to form a secondary preform from which the hollow-core fiber is drawn, wherein the geometric dimensions $OD_{NE}$, $ID_{NE}$, $OD_{ARE}$, $ID_{ARE}$ as well as $OD_{ARE\_cap}$ and $WT_{ARE\_cap}$ are aligned in relation to one another in such a way that the ARE-external capillary of the capillary blank has a degree of ovality of less than 1.025.

2. The method according to claim 1, wherein the geometric dimensions are set in connection with the following factors (F1) to (F4):
   (F1) the ratio of the equilibrium pressure $p_{eg\_NE}$ of the NE inner tube and of the equilibrium pressure $p_{eq\_ARE}$ of the ARE outer tube,
   (F2) the distance between the ARE outer tube and the NE inner tube relative to the internal diameter of the ARE outer tube $(ID_{ARE}-OD_{NE})/ID_{ARE}$,
   (F3) the taper ratio $OD_{ARE}/OD_{ARE\_cap}$ during thermal stretching of the capillary blank ensemble according to method step (b2),
   (F4) the ratio $OD_{ARE\_cap}/WT_{ARE\_cap}$ of external diameter and wall thickness of the capillary blank.

3. The method according to claim 2, wherein the diameter dimensions of ARE outer tube or of NE inner tube are selected such that the equilibrium pressure $p_{eq,NE}$ is in the range of 60 to 90 Pa, preferably in the range of 65 to 80 Pa, and the equilibrium pressure $p_{eq\_ARE}$ is in the range of 25 to 50 Pa, preferably in the range of 30 to 40 Pa.

4. The method according to claim 2, wherein the equilibrium pressures $p_{eq;\ NE}$ and $p_{eq;\ ARE}$ are advantageously set such that the factor (F1) assumes a value in the range of 1.5 to 2.5, preferably a value in the range of 1.5 to 2.

5. The method according to claim 2, wherein the factor (F2) is set to a value in the range of 0.2 to 0.5, preferably to a value in the range of 0.3 to 0.4.

6. The method according to claim 2, wherein the factor (F3) is set to a value in the range of 5 to 10, preferably to a value in the range of 5 to 8.

7. The method according to claim 2, wherein the factor (F4) is set to a value in the range of 15 to 25, preferably to a value in the range of 15 to 20.

8. The method according to claim 2, wherein the factors (F1) to (F4) are set such that the capillary blank has a degree of ovality of less than 1.025.

9. The method according to claim 2, wherein the mathematical product of factors (F1) to (F4) defines a geometric parameter, $$\text{Parameter}(geo) = \frac{peq_{NE}}{Peq_{ARE}} \times \frac{ID(ARE) - OD(NE)}{ID(ARE)} \times \frac{OD(ARE)}{OD(ARE)_{cap}} \times \frac{OD(ARE)_{cap}}{WT(ARE)_{cap}}$$

which is in the range of 35 to 75, preferably in the range of 40 to 60.

10. The method according to claim 1, wherein the primary preform has an external diameter in the range of 26 to 230 mm, preferably of 30 to 200 mm.

11. A method for producing a preform for an anti-resonant hollow-core fiber comprising a hollow core extending along a longitudinal axis of the fiber and an inner sheath region surrounding the hollow core, which sheath region comprises a plurality of anti-resonance elements, comprising the method steps of:
   (a) providing a sleeve tube comprising an inner bore of the sleeve tube and a longitudinal axis of the sleeve tube, along which a sleeve tube wall delimited by an inner side and an outer side extends,
   (b) providing tubular anti-resonance element preforms, at least a portion of which is present as a capillary blank comprising at least one anti-resonant element (ARE) external capillary and at least one nested element (NE) internal capillary connected to an inner lateral surface of the ARE external capillary, wherein the production of the capillary blank comprises the following method steps:
      (b1) fixing an NE inner tube, which has an external diameter $OD_{NE}$ and an internal diameter $ID_{NE}$, on the inner lateral surface of an ARE outer tube having an external diameter $OD_{ARE}$ and an internal diameter $ID_{ARE}$, to form a capillary blank ensemble,
      (b2) thermal stretching of the capillary blank ensemble to form the capillary blank, which has a maximum external diameter $OD_{ARE\_cap}$ and a maximum wall thickness $WT_{ARE\_cap}$,
   (c) mounting the capillary blank at target positions on the inner side of the sleeve tube wall to form a primary preform comprising a hollow core region and a sheath region, and
   (d) further processing the primary preform to form a secondary preform for the hollow-core fiber, wherein the further processing comprises a single or repeated performance of one or more of the following hot-forming processes:
      (i) elongation,
      (ii) collapse,
      (iii) collapse and simultaneous elongation,
      (iv) collapse of additional sheath material,
      (v) collapse of additional sheath material and subsequent elongation,
      (vi) collapse of additional sheath material and simultaneous elongation, wherein the geometric dimensions $OD_{NE}$, $ID_{NE}$, $OD_{ARE}$, $ID_{ARE}$ as well as $OD_{ARE\_cap}$ and $WT_{ARE\_cap}$ are aligned in relation to one another in such a way that the ARE external capillary of the capillary blank has a degree of ovality of less than 1.025.

12. The method according to claim 11, wherein the geometric dimensions are set in connection with the following factors (F1) to (F4):
   (F1) the ratio of the equilibrium pressure $p_{eg\_NE}$ of the NE inner tube and of the equilibrium pressure $p_{eq\_ARE}$ of the ARE outer tube,
   (F2) the distance between the ARE outer tube and the NE inner tube relative to the internal diameter of the ARE outer tube $(ID_{ARE}-OD_{NE})/ID_{ARE}$,
   (F3) the taper ratio $OD_{ARE}/OD_{ARE\_cap}$ during thermal stretching of the capillary blank ensemble according to method step (b2),
   (F4) the ratio $OD_{ARE\_cap}/WT_{ARE\_cap}$ of external diameter and wall thickness of the capillary blank.

13. A capillary blank as an intermediate product for the production of an anti-resonant hollow-core fiber comprising at least one anti-resonsant element (ARE) external capillary and at least one nested element (NE) internal capillary connected to the inner lateral surface of the ARE external capillary, wherein the ARE external capillary has a degree of ovality of less than 1.025.

14. A preform for an anti-resonant hollow-core fiber, wherein the preform comprises a hollow core region and a sheath region, which comprises a sleeve tube with a sleeve tube wall and a number of tubular anti-resonant element preforms arranged on an inner side of the sleeve tube wall, wherein at least a portion of the anti-resonant element preforms is designed as a capillary blank according to claim 13.

* * * * *